(No Model.) 3 Sheets—Sheet 1.
F. J. FALDING.
PROCESS OF AND APPARATUS FOR MAKING CONCENTRATED SULFURIC ACID.
No. 541,041. Patented June 11, 1895.
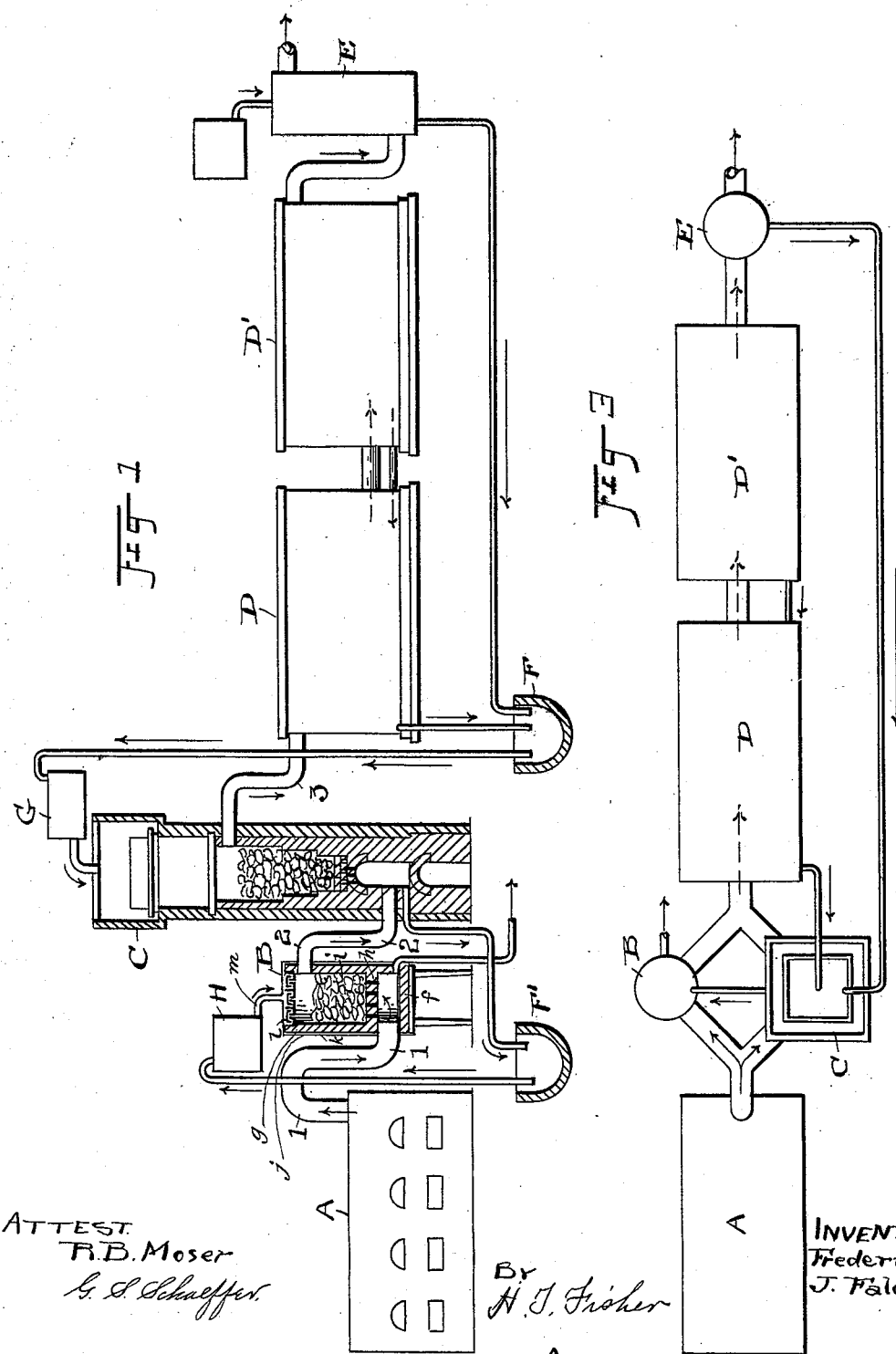
ATTEST.
R. B. Moser
G. S. Schaeffer
By H. J. Fisher
ATTORNEY.
INVENTOR.
Frederic J. Falding (No Model.) 3 Sheets—Sheet 2.
F. J. FALDING.
PROCESS OF AND APPARATUS FOR MAKING CONCENTRATED SULFURIC ACID.
No. 541,041. Patented June 11, 1895.
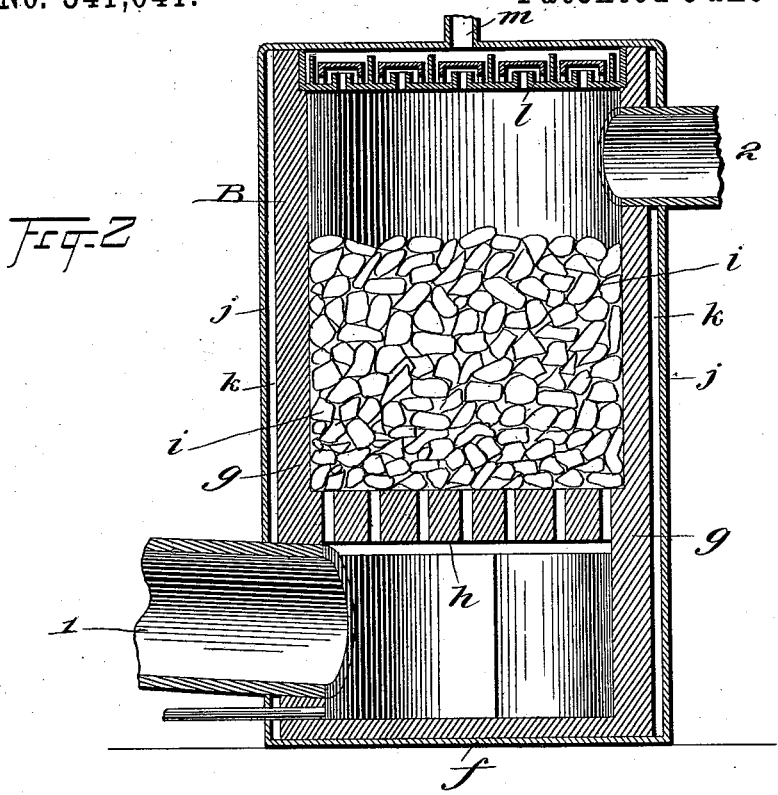
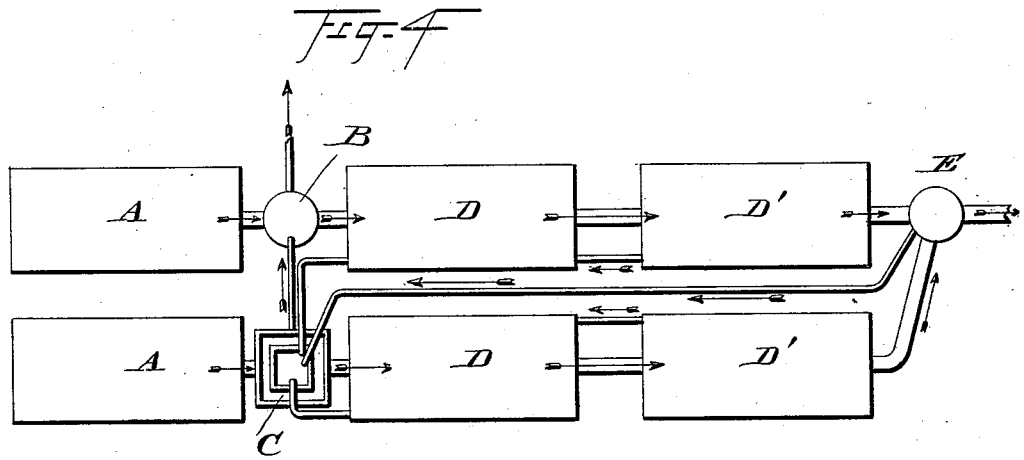
Witnesses, Inventor
Frederic J. Falding
by Wm. H. Finckel
his atty.

(No Model.) 3 Sheets—Sheet 3.
F. J. FALDING.
PROCESS OF AND APPARATUS FOR MAKING CONCENTRATED SULFURIC ACID
No. 541,041. Patented June 11, 1895.
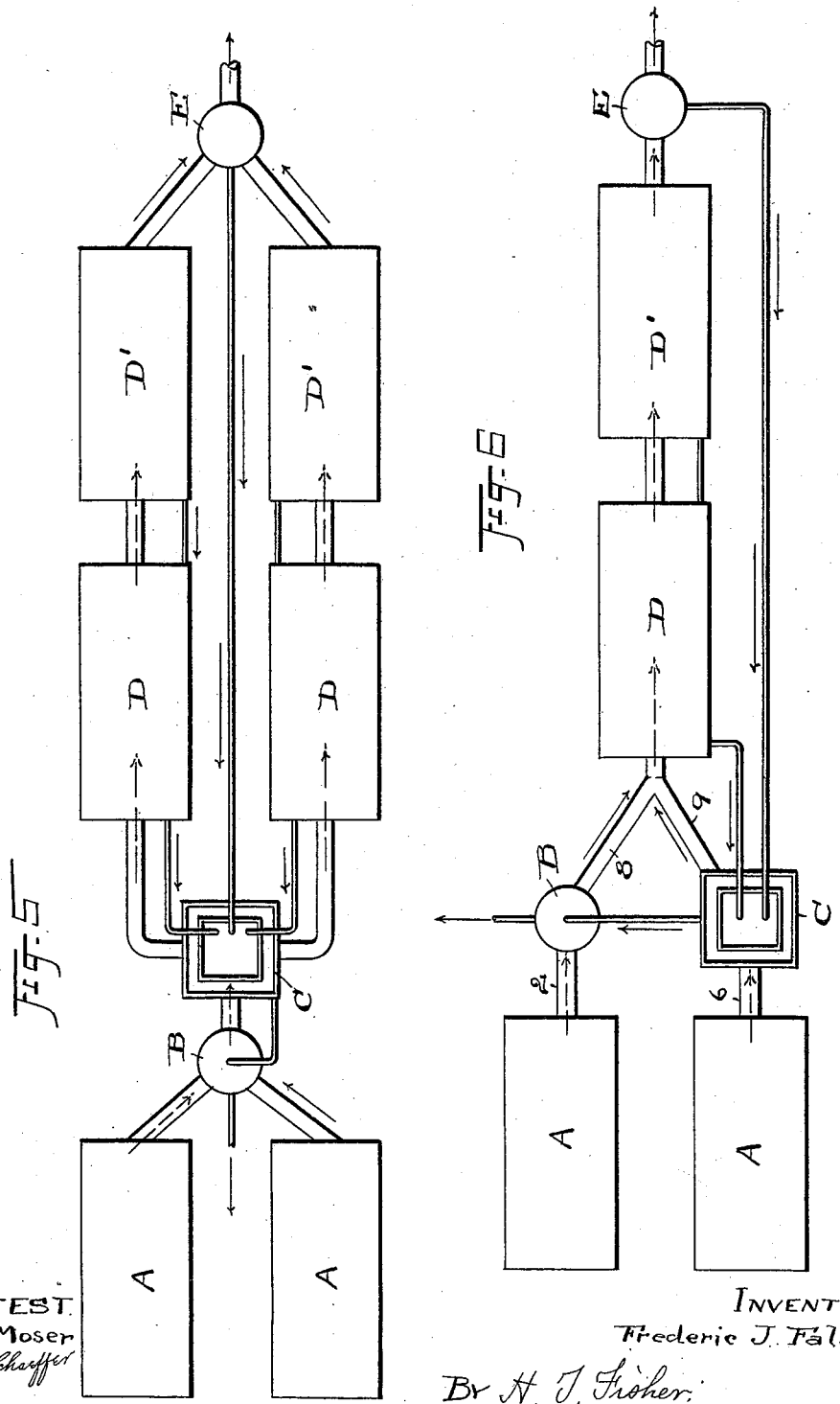
ATTEST
R. B. Moser
G. S. Schaeffer
INVENTOR
Frederic J. Falding
By H. J. Fisher
ATTORNEY.

UNITED STATES PATENT OFFICE.

FREDERIC J. FALDING, OF CLEVELAND, OHIO.

PROCESS OF AND APPARATUS FOR MAKING CONCENTRATED SULFURIC ACID.

SPECIFICATION forming part of Letters Patent No. 541,041, dated June 11, 1895.

Application filed June 23, 1893. Serial No. 478,609. (No model.)

*To all whom it may concern:*

Be it known that I, FREDERIC J. FALDING, a citizen of the United States, residing at Cleveland, in the county of Cuyahoga and State of Ohio, have invented certain new and useful Improvements in Methods of and Apparatus for Concentrating Sulfuric Acid; and I do hereby declare that the following is a full, clear, and exact description of the invention, which will enable others skilled in the art to which it appertains to make and use the same.

My invention relates to a method of and apparatus for concentrating sulfuric acid.

In the manufacture of sulfuric acid, as generally conducted heretofore, the acid obtained from the system is about 60° Baumé, or thereabout, and has to be further concentrated in expensive apparatus especially constructed and maintained for that purpose.

My invention has for its object, among other things, to avoid the necessity of such expensive apparatus and to simplify, as well as cheapen, the method of and apparatus for concentrating the acid.

One of the distinguishing characteristics of my invention is the utilization of the hot gases coming from the ore burners for the concentration of the acid to a high degree, such as 66° Baumé, or thereabout.

Having thus stated the principle of my invention, I will proceed now to describe the same in detail, and then will particularly point out and distinctly claim the part or improvement which I claim as my invention.

In the accompanying drawings illustrating my invention, in the several figures of which like parts are similarly designated, Figure 1 is a sectional side elevation, in a somewhat conventional form, of one form of an apparatus embodying my invention. Fig. 2 is a vertical section, on a larger scale, of the concentrating apparatus. Figs. 3, 4, 5, and 6 are diagrams of various forms of arrangement of apparatus embodying my invention.

I will describe, first, some modifications made in accordance with my invention in the apparatus that is commonly employed in the manufacture of sulfuric acid.

A, may represent burners of any approved construction for gasifying the acid-producing material.

The concentrating apparatus B may be varied considerably in construction without departing from the invention, but a satisfactory form thereof as shown here, consists of a base or bottom —$f$—, walls —$g$—, and grate or other open-work support —$h$— for the filling —$i$—, and the said base, walls and support —$h$— may be made of stone or other refractory material, of a silicious or other nature. In the preferred form of this concentrating apparatus, a jacket —$j$— of lead surrounds the apparatus, but is separated therefrom by an air space —$k$—. The top of this apparatus is provided with an acid-distributing device —$l$—, of any approved construction, and with an acid induct —$m$—.

The denitrating apparatus C may be a Glover tower or any other suitable or convenient apparatus for effecting denitration of the acid.

The lead chambers D, D' may be of ordinary construction.

Figs. 1, 3, 4, 5 and 6 show as many different forms of arrangement of the sulfuric acid plant constructed in accordance with my invention. In all of these forms it will be observed, as will hereinafter appear, that the hot gases from the ore burners are delivered, more or less immediately and directly, into the concentrating apparatus.

Referring to Fig. 1, the ore burners A are connected by a pipe 1 with the lower end of the concentrating apparatus B and deliver the gases from the ore burners into the said concentrating apparatus beneath the support —$h$—, so that the said gases rise in said concentrating apparatus through the filling —$i$— and thence escape at the top through the pipe 2 into the bottom of the Glover tower C. The gases ascend through the Glover tower and escape at its top through a pipe 3 into the first chamber D, and thence through the series of chambers and thence through the Gay-Lussac tower E. The acid passes in the reverse direction from the series of lead chambers into an acid-egg F, of ordinary construction, whence it is forced into a tank G, and from that tank is delivered into the Glover tower, which may be supplied with a distributer like that shown at —$l$— in Fig. 2 in the concentrating apparatus, and descending through the Glover tower, and there subjected to a denitrating action, it is delivered into a second acid-egg F', whence it is forced into a tank H, from which it is delivered into the distributer —l— of the concentrating apparatus B, and from this concentrating apparatus it is conveyed away to a storage tank, or otherwise, as desired.

Instead of using acid-eggs for transferring the acid from the chambers to the Glover tower and from the Glover tower to the concentrating apparatus, or from either of these to the other, gravity may be availed of by suitably arranging these several apparatus at proper relative elevations. By this method of manufacturing sulfuric acid, an acid of 66° Baumé may be readily obtained from the concentrating apparatus.

It will be observed that the gases from the ore burners pass through the apparatus in one direction, while the acid passes through in the opposite direction, and that in the concentrating apparatus the acid is subjected or exposed to the hot gases as they come from the ore burners, and thus one heating apparatus or furnace subserves the double purpose of generating the sulfurous gases and of concentrating the acid.

It is to be observed that in all instances the acid supplied to the concentrating apparatus is previously denitrated; or, in other words, the concentrating apparatus is not relied upon for denitrating, but denitration is carried on in an independent or separate apparatus, and in this particular this apparatus differs from the so-called Glover tower.

Some of the modifications of the arrangement of the plant are illustrated in Figs. 3, 4, 5 and 6. In Fig. 3, one set of ore burners is connected by a branch pipe with the concentrating apparatus on one side and the denitrating apparatus on the other, and a branch pipe leading from these two apparatus opens into a single pipe, which communicates with the lead chambers. The return of the acid will be as before, namely, from the lead chambers to the denitrating apparatus and thence to the concentrating apparatus.

In Fig. 4, two sets of ore burners and lead chambers are used, and in this case the gases from one set of ore burners pass through the concentrating apparatus to the series of lead chambers therewith connected, and the gases from the other set of ore burners pass through the denitrating apparatus to its set of connected lead chambers, while the acid from both sets of lead chambers is conveyed to the denitrating apparatus and thence to the concentrating apparatus.

In Fig. 5, two sets of ore burners and two sets of lead chambers are used, and the gases from both sets of ore burners pass, first, through the concentrating apparatus and thence through the denitrating apparatus, and are divided between the two sets of lead chambers, while the acid from both sets of lead chambers is returned, first, into the denitrating apparatus and thence to the concentrating apparatus.

In Fig. 6, two sets of ore burners are used and one set of lead chambers, and the gases from one set of ore burners pass through the concentrating apparatus by pipe 2, and the gases from the other set of ore burners pass through pipe 6 into the denitrating apparatus, while the gases from the concentrating apparatus and the denitrating apparatus are conducted into one set of lead chambers by pipes 8 and 9, and the acid from the lead chambers is returned to the denitrating apparatus and thence to the concentrating apparatus.

Other modifications of the arrangement of the plant are within the spirit and scope of my invention, so long and so far as the concentrating apparatus receives the hot gases from the ore burners. As already intimated, in all instances, I conceive that the best results will be obtained if denitration be carried on in an apparatus separate from the concentrating apparatus.

Having thus described my invention, what I claim is—

1. The method of manufacturing concentated sulfuric acid, consisting in exposing denitrated chamber acid to the action of hot burner gases in an independent concentrating apparatus, substantially as described.

2. The method of manufacturing concentrated sulfuric acid, which consists in conducting the hot gases from the burners through a concentrating apparatus and a denitrating apparatus to the lead chambers, and then returning the acid so formed first through the denitrating apparatus and then to the concentrating apparatus and therein exposing the thus denitrated acid to the action of the hot gases from the burners, and thereby concentrating the same, substantially as described.

3. The method of manufacturing concentrated sulfuric acid, which consists in denitrating chamber acid in an individual apparatus erected for that purpose, and thereafter in a separate apparatus exposing the thus denitrated acid to the action of hot burner gases, and therein and thereby concentrating such acid, substantially as described.

4. An apparatus for manufacturing concentrated sulfuric acid, consisting of ore burners, a concentrating apparatus, a denitrating apparatus connected with but separate and independent in construction and operation from the concentrating apparatus, the ore burner gases being delivered to and passing through both apparatuses, lead chambers to which the gases pass, and means to convey the acid from such chambers to the denitrating apparatus, and thence to the independent concentrating apparatus wherein the said acid is concentrated in presence of the hot gases from the ore burners, substantially as described.

Witness my hand to the foregoing specification this 15th day of June, 1893.

FREDERIC J. FALDING.

Witnesses:
EUGENE GRAESELLI,
H. C. GRANT.